(12) United States Patent
Idgunji et al.

(10) Patent No.: US 11,379,708 B2
(45) Date of Patent: Jul. 5, 2022

(54) TECHNIQUES FOR EFFICIENTLY OPERATING A PROCESSING SYSTEM BASED ON ENERGY CHARACTERISTICS OF INSTRUCTIONS AND MACHINE LEARNING

(71) Applicant: NVIDIA Corporation, Santa Clara, CA (US)

(72) Inventors: Sachin Idgunji, San Jose, CA (US); Ming Y. Siu, Santa Clara, CA (US); Alex Gu, San Jose, CA (US); James Reilley, San Jose, CA (US); Manan Patel, San Jose, CA (US); Rajeshwaran Selvanesan, Cupertino, CA (US); Ewa Kubalska, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 445 days.

(21) Appl. No.: 16/514,078

(22) Filed: Jul. 17, 2019

(65) Prior Publication Data
US 2020/0050920 A1 Feb. 13, 2020

Related U.S. Application Data

(60) Provisional application No. 62/716,513, filed on Aug. 9, 2018.

(51) Int. Cl.
*G06F 9/30* (2018.01)
*G06N 3/04* (2006.01)
(Continued)

(52) U.S. Cl.
CPC ......... *G06N 3/0418* (2013.01); *G06F 1/3206* (2013.01); *G06F 9/30145* (2013.01);
(Continued)

(58) Field of Classification Search
CPC .. G06F 1/3206; G06F 9/3877; G06F 9/30196; G06F 9/30145; G06N 3/082; G06N 3/041
See application file for complete search history.

(56) References Cited

U.S. PATENT DOCUMENTS 9,229,506 B1 * 1/2016 Holzman ................ G06F 1/324
2003/0074542 A1 * 4/2003 Sasagawa ............. G06F 9/3853
712/E9.035

(Continued)

OTHER PUBLICATIONS

Borovyi et al.; Using Neural Network for the Evaluation of Power Consumption of Instructions Execution; IEEE; 2008 (Year: 2008).*
(Continued)

*Primary Examiner* — Corey S Faherty
(74) *Attorney, Agent, or Firm* — Nixon & Vanderhye, P.C.

(57) ABSTRACT

An integrated circuit such as, for example a graphics processing unit (GPU), includes a dynamic power controller for adjusting operating voltage and/or frequency. The controller may receive current power used by the integrated circuit and a predicted power determined based on instructions pending in a plurality of processors. The controller determines adjustments that need to be made to the operating voltage and/or frequency to minimize the difference between the current power and the predicted power. An in-system reinforced learning mechanism is included to self-tune parameters of the controller.

25 Claims, 9 Drawing Sheets

(51) Int. Cl.
*G06N 3/08* (2006.01)
*G06F 9/38* (2018.01)
*G06F 1/3206* (2019.01)

(52) U.S. Cl.
CPC ........ *G06F 9/30196* (2013.01); *G06F 9/3877* (2013.01); *G06N 3/082* (2013.01)

(56) References Cited

U.S. PATENT DOCUMENTS

| | | | | |
|---|---|---|---|---|
| 2006/0053323 A1* | 3/2006 | Kissell | .................... | G06F 21/81 |
| | | | | 713/300 |
| 2007/0136720 A1* | 6/2007 | Roy | .......................... | G06F 9/30 |
| | | | | 717/140 |
| 2008/0189561 A1* | 8/2008 | Singh | .................... | G06F 1/3296 |
| | | | | 713/300 |
| 2009/0070607 A1* | 3/2009 | Safford | ................. | G06F 1/3203 |
| | | | | 713/320 |
| 2012/0084790 A1* | 4/2012 | Elshishiny | ............ | G06F 9/4893 |
| | | | | 718/108 |
| 2013/0111191 A1* | 5/2013 | Murray | ................... | G06F 11/30 |
| | | | | 712/214 |
| 2019/0041951 A1* | 2/2019 | Shapira | ................. | G06F 1/3287 |

OTHER PUBLICATIONS

U.S. Appl. No. 16/049,916, filed Jul. 31, 2018.

Grondman, Ivo, et al., "A Survey of Actor-Critic Reinforcement Leaning: Standard and Natural Policy Gradients," IEEE Transactions on Systems, Man and Cybernetics—Part C: Application and Reviews, IEEE, vol. 42, No. 6, 2012, pp. 1291-1307.

Konda, Vijaymohan R., et al., "Actor-Critc-Type Learning Algorithms for Markov Decision Processes," SIAM Journal an Control and Optimization, vol. 38, No. 1, 1999, pp. 94-123.

Sutton, Richard S., et al., "Reinforcement Learning—An Introduction," Second Edition, The MIT Press, Cambridge, Massachusetts, 2018, 548 pages.

* cited by examiner

TECHNIQUES FOR EFFICIENTLY OPERATING A PROCESSING SYSTEM BASED ON ENERGY CHARACTERISTICS OF INSTRUCTIONS AND MACHINE LEARNING

CLAIM OF PRIORITY

This application claims the benefit of U.S. Provisional Application No. 62/716,513, titled "Energy aware instruction based power management for efficient system operation," filed Aug. 9, 2018, the entire contents of which is incorporated herein by reference.

FIELD

This technology relates to integrated circuit power management, and more particularly to dynamic voltage and/or frequency adjustment for power management in an integrated circuit. Still more particularly, this technology relates to managing power based on sensing upcoming processor instructions and predicting/refining power control system parameters with an in-system reinforced learning mechanism. Use cases include power management of massively parallel processors of a GPU.

BACKGROUND

Graphics processors (GPUs) have become ubiquitous. No longer just for graphics, GPUs are now used for a wide range of applications benefitting from intensive computing operations including for example artificial intelligence, real time pattern recognition and autonomous vehicle control, and countless other applications.

Many GPU's are massively parallel—meaning they contain many computing elements (e.g., programmable streaming multi-processors ("SM"s)) operating in parallel. This massively parallel architecture allows developers to break down complex computation into smaller parallel pieces that, because they are being performed concurrently, will complete much faster. While exceedingly fast, such an array of parallel computing elements can consume lots of power and generate lots of heat. Therefore, power management has become an important aspect of GPU (and other) complex integrated circuit design and operation.

Just as a dancer consumes more energy fast dancing than slow dancing, a digital circuit usually consumes more power when it operates faster. In most integrated circuits, operating speed is controlled by a clock circuit. The clock circuit sends out a "beat" (clocking signal) to various circuits on the chip. The circuits synchronize their operation to the "beat" of the metronome-like clocking signal. The faster the beat, the faster the circuits operate and the more power they consume. But also, the faster the beat, the more "moves" the circuits can perform in a given time.

Power supply voltage also has an effect on speed and power consumption. Transistors (e.g., MOSFETs) are used to construct the digital logic circuits that are the building blocks of modern high speed processors. The transistors operate (switch) faster when power supply voltage is increased. One way to think about this: switching a MOSFET transistor involves charging and discharging its capacitance. Increasing DC voltage supplying power to the MOSFET allows faster charging of the MOSFET's capacitance, thus increasing the transistor's switching speed. This is similar to using higher water pressure to fill a bucket faster. The fastest speed at which the MOSFET can be clocked may thus depend on power supply voltage.

However, operating circuits at higher voltage causes the circuits to consume more power while increasing their potential operating speed. Generally speaking, the more power the circuit consumes, the more heat it generates. While fans and heat sinks are typically used to remove excess heat, undue heating wastes power that could otherwise be used for computation. For mobile applications such as autonomous vehicles, portable devices and the like, wasted power reduces battery life unnecessarily. Even for stationary applications such as servers and desktop computers, wasting power is bad for the environment and increases operating costs.

While the most straightforward solution is to slow down the circuit's operating speed to conserve power, this will adversely affect the number of operations per second the circuit can perform and thus the speed at which it can perform complex computations. In many demanding applications including but not limited to autonomous vehicles and user-interactive servers and other computing devices, high speed performance is important for safety-critical and other computations that must be performed in real time or close to real time.

There is thus a tradeoff between speed of operation and power consumption. To increase the number of operations per second, one can increase the rate (frequency) of the clocking signal (and if needed to support the higher clock rate, also the power supply voltage) at the expense of additional power consumption. To conserve power, one can decrease the clocking signal rate (and if desired also the power supply voltage) at the expense of slower processing.

To manage this tradeoff, some GPUs and other processors provide dynamic control over the clock rate (and in some cases also power supply voltage to support the higher clock rate) depending on computation load, allowing the circuits to "slow dance" when processing demands are less and enabling them to "fast dance" when more computation speed is called for. Such dynamic control can reduce overall power consumption and corresponding heat output while maximizing speed performance.

While much work has been done in the past, there is a need for further improved solutions that provide an adaptive but tunable system that can handle sudden load step and load releases, without impacting overall performance.

BRIEF DESCRIPTION OF THE DRAWINGS

The following detailed description of exemplary non-limiting illustrative embodiments is to be read in conjunction with the drawings of which.

DETAILED DESCRIPTION OF EXAMPLE EMBODIMENTS

Figure 1:
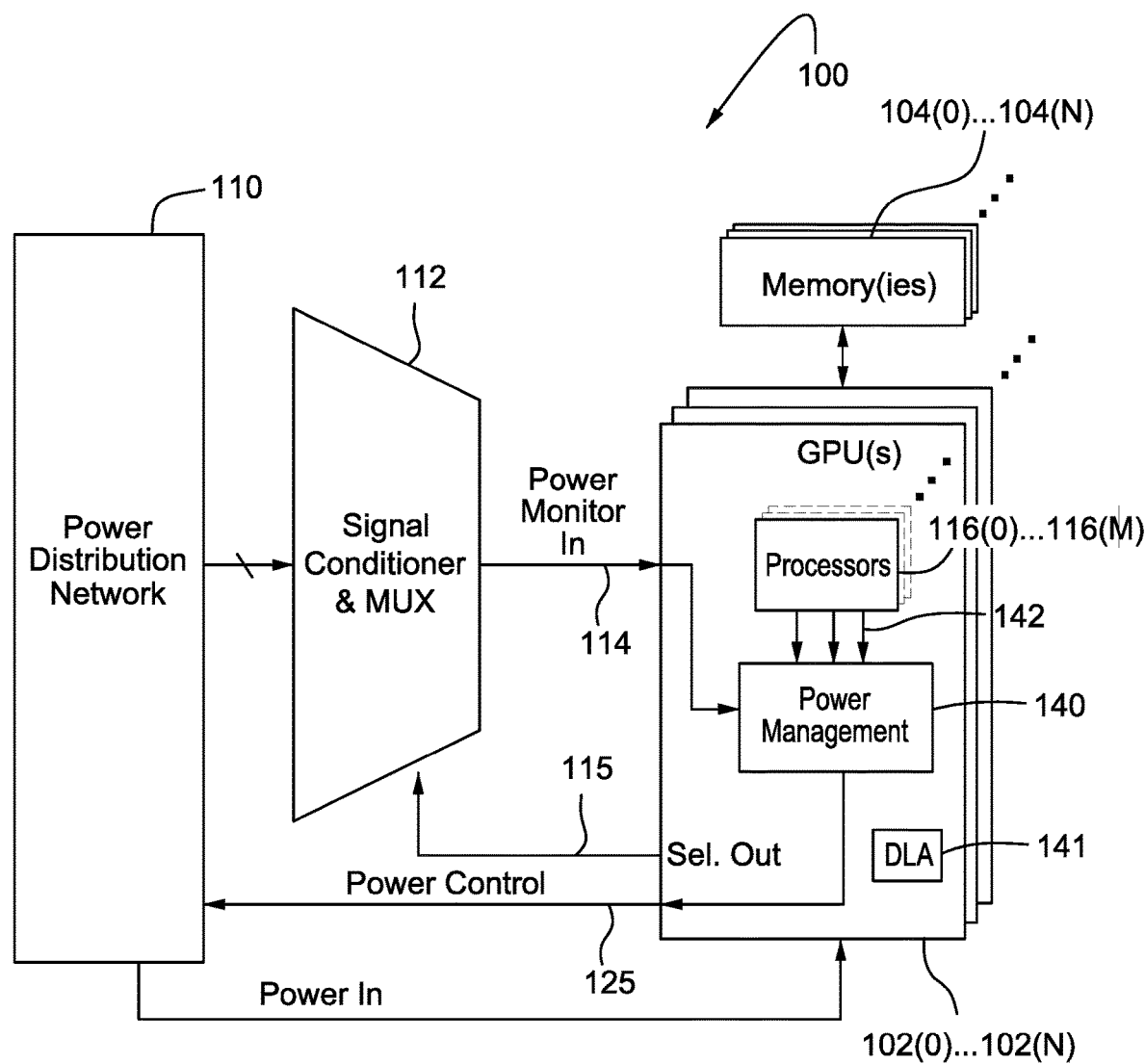
FIGS. 1 and 2 schematically illustrate an example system including proactive power management control according to certain example embodiments.

Many GPUs, during runtime, engage DVFS (dynamic voltage and frequency scaling) that deploys a load-based setting of the voltage and frequency of the GPU to get the highest performance under a power envelope. In this context, load is defined as the energy intensity of the work being done on the GPU. Math dominated workloads constitute a large load because the math operations running on streaming multiprocessors (SMs) within the GPU can consume high energy in a clock cycle. In contrast, when work is memory dominated and does not use as many math operations in the SMs, the work is deemed as moderate or low load (in such cases, the SM's may spend much of their time waiting for the memory system to retrieve data from memory).

By its nature, the load based DVFS is reactive in nature. This load based DVFS, however, can lead to an adverse behavior, where an operating point at high voltage/high frequency could suddenly experience a load step on the GPU. This occurs principally because the work launched on the GPU can quickly change from a math dominated regime to a memory dominated regime and vice-versa within short timescales where DVFS cannot operate. A load step is when the energy consumed in the GPU increases because at a given voltage and frequency, high energy operations can occur. For the GPU, this is when it executes high power math instructions. This condition can result in overshoot of peak power at short timescales that in turn stresses the electrical/power delivery system for the GPU and can result in brown outs or reliability issues.

High energy instructions (such as, for example, matrix math instructions (MMA) or TensorCore instructions which allow acceleration of large matrix operations at the heart of artificial intelligence) increase the energy consumed in a clock cycle significantly and can have an impact on power delivery networks to cause reliability or timing issues. This can lead to the GPU having to maintain margins that eat into performance. To address these issues, we need an adaptive but tunable system to ensure that we can modulate the energy consumption to mitigate these adverse effects, without impacting overall performance. Fundamentally, the current approaches to handle such effects fall short of achieving optimal operating point management as described below.

Current approaches to prevent short time scale power excursions include:
1) Preventive—Capping the operating maximum frequency to prevent or limit such excursions; and
2) Reactive—By deploying sensors that sense the increased power/current and then actuating by reducing the operating voltage and frequency through adaptive voltage and frequency scaling.

These approaches can be effective but have their caveats/limitations.

The first approach limits the maximum frequency the GPU can operate at reliably and leaves performance on the table. This approach by design, ensures that the peak power is limited at short timescales but the capped maximum operating frequency is likely to limit performance at longer timescales which can be important for measuring energy efficiency of the GPU.

The second approach is a reactive approach and depends on the time to sense and activate that can have latencies, so they are effective, but the timescales of efficacy typically do not typically stretch below 100 usec.

The reason for this is because there is a cost to measuring the change in the load in a reactive manner, since that change in load manifests as a change in power/current draw which has sensing latency associated with it. As a system designer attempts to go to ever lower timescales of managing peak power, she runs up against some limits of external components (e.g., channel multiplexing) that can be the bottleneck in speeding up sensing.

An alternate approach would be to be given a hint of the change in workload (load step/release) in-situ so that this proactive approach can guide the power management to adjust the delivery to prevent reliability issues. However, detecting a sudden and large change in workload is particularly difficult in the front-end stages of the GPU pipeline, especially in compute workloads where the program semantics are not visible to the front end of the GPU pipeline. However, stages later in the GPU pipeline (e.g., in the Streaming Multiprocessor (SM) of NVIDIA GPUs) is an ideal location for the detection since the semantics are visible as the instructions in the program can be decoded to identify such changes in load.

The load change management is not limited just to the load step (i.e. an increase in current/power), but in addition there is also a need to manage sudden reductions in power (load release). A sudden load release can cause the power supply to overshoot due to the stored energy in the reactive components, causing inductive kickback, and that can cause the power regulation system to trip as well.

Detecting a sudden and large change in workload is particularly difficult in the front end stages of the GPU pipeline, however the middle stages of the GPU (such as SMs in NVIDIA GPUs) can detect instructions in the programs that are likely to result in load step/release behavior effectively prior to the execution of the instructions.

Instruction Pre-Decode to Estimate Future Power Needs

Example embodiments provide a proactive sensing method by which a potential or likely load step event can be identified (such as by a SM) through instruction pre-decode. Instruction pre-decode by an instruction lookahead pre-decoder that operates on a queue or buffer of fetched instructions before they are executed allows for the instruction to be tagged/identified a priori the instruction being dispatched for execution. Such instruction lookahead pre-decoder can be additional to the typical instruction decoder used to decode the instruction for execution. Instruction lookahead pre-decoding allows for notification of an upcoming load step/release event prior to the event's actual occurrence a few clock cycles later. This advance notification of the event to the power management unit allows for making changes to prevent peak power overshoot scenarios.

A power management unit tracks the operating voltage and frequency and can use this notification to take actions to move the voltage and/or frequency towards the regime of operation to arrest high power events. Moving either voltage and/or frequency to reduce power in this manner can reduce electrical reliability issues at shorter timescales than other approaches, but without compromising performance.

From an architectural analysis, example embodiments can clearly identify the instructions which on execution can result in high energy consumed in a clock cycle, that lead to higher power. The instruction pre-decode can classify these instructions as they pass through the front end of, for example, the SM pipeline and notify these events to a GPU level power management unit (PMU). Once high energy instructions are identified (e.g., in the SM), the information is consumed to actuate changes in hardware and/or software to manage the peak power step or release.

At the GPU level, the PMU aggregates these notifications from, for example, all the SMs in the GPU, and then based on the temporal and spatial characteristics of these event occurrences, can compute the potential for the magnitude of the sudden work increase or decrease. This allows the PMU to make a proportional change depending on full GPU workload since there could be variation in the workload running on each SM. The PMU makes changes at the appropriate time scale to implement a clock frequency only or a voltage/frequency change to limit the peak power in anticipation of the high-power event, thereby avoiding overshoot and improving the system level operation.

In one example non-limiting embodiment, each SM includes a pre-decoder that outputs a digital code, encoded to signify the energy of instructions to be executed in the future. The digital codes from the various SM's are accumulated, filtered and smoothed by digital processing to feed a control system. Since it would be limiting to derive the parameters for the control system with an offline supervised training system, example embodiments continually refine the control system parameters with an in-system learning mechanism. Example embodiments allow for improved performance within a power envelope (Perf/W) with robust system level operation at short timescales; for example, in server-based systems desired to have the highest efficiency (performance at a power envelope) with high reliability of system operation.

Actuation

In example non-limiting embodiments, sensing of high energy instruction changes from the SM are used to actuate changes in hardware or software to manage the peak power step or release. At the GPU level, the PMU aggregates these notifications from all the SMs in the GPU, and then based on the temporal and spatial characteristics of these event occurrences, can compute the potential for the magnitude of the sudden work increase or decrease.

One approach according to example embodiments is to use a "PID" (proportional-integral-derivative) controller that allows for fixed or self-tuned parameters for the controller. The PID controller output can execute a frequency only, a voltage only or a voltage/frequency change based on the timescale at which to manage the power.

In one example non-limiting embodiment, the high energy instruction notifications from the SMs are aggregated into an IIR (infinite impulse response) filter whose output provides an effective change in compute energy of the GPU. The compute energy along with the set voltage and frequency give a near future power estimate. Example embodiments take the difference of this future power estimate against the current measured power. This difference, aka error or delta, is fed to a PID controller. Example embodiments provide an adaptive PID controller, where the PID control parameters are not static but updated based on a deep reinforced (reinforcement) learning approach. The machine learning approach may have a different time scale than the operation of the PID, allowing for example the PID to operate much faster than the adaptivity the learning approach provides.

Since the workloads can be diverse and varying at short time scales, some example non-limiting embodiments use a reinforced learning approach using an Actor-Critic or Q machine learning (ML) to update the PID parameters. The reinforced learning can observe the effect of particular operating parameters of the PID on peak power step and release, and tune those operating parameters to optimize power management performance.

In example non-limiting embodiments, the PID controller moves the frequency and/or voltage to reduce the error to 0 (or at least minimize it), and in parallel, the inputs (error, measured power and predicted power) are fed to a PMU processor or controller. The PMU processor/controller runs a self-tuning learning algorithm that can periodically update the controller parameters based for example on the characteristics of the error.

The hardware (HW) actuated and software (SW) tuned approach allows for a superior control system that is predicting the power overage to implement a frequency only or a voltage/frequency change to limit the peak power in anticipation of the high-power event, thereby improving the system level operation and reliability when operating under the max efficiency (Perf@W). As the reinforced machine learning gains further experience with power management results on the particular GPU it is operating on, it more effectively tunes performance to avoid overpower (step and release) scenarios the PID controller would otherwise order based on anticipated computation load. In some embodiments, the reinforced machine learning is able to command the SMs to alter their instruction execution (e.g., by delaying execution of high power instructions or otherwise load balancing power required for instruction execution between different time intervals) to further avoid system oversteps and over-releases.

High-Level View of Power Management Control

Figure 2:
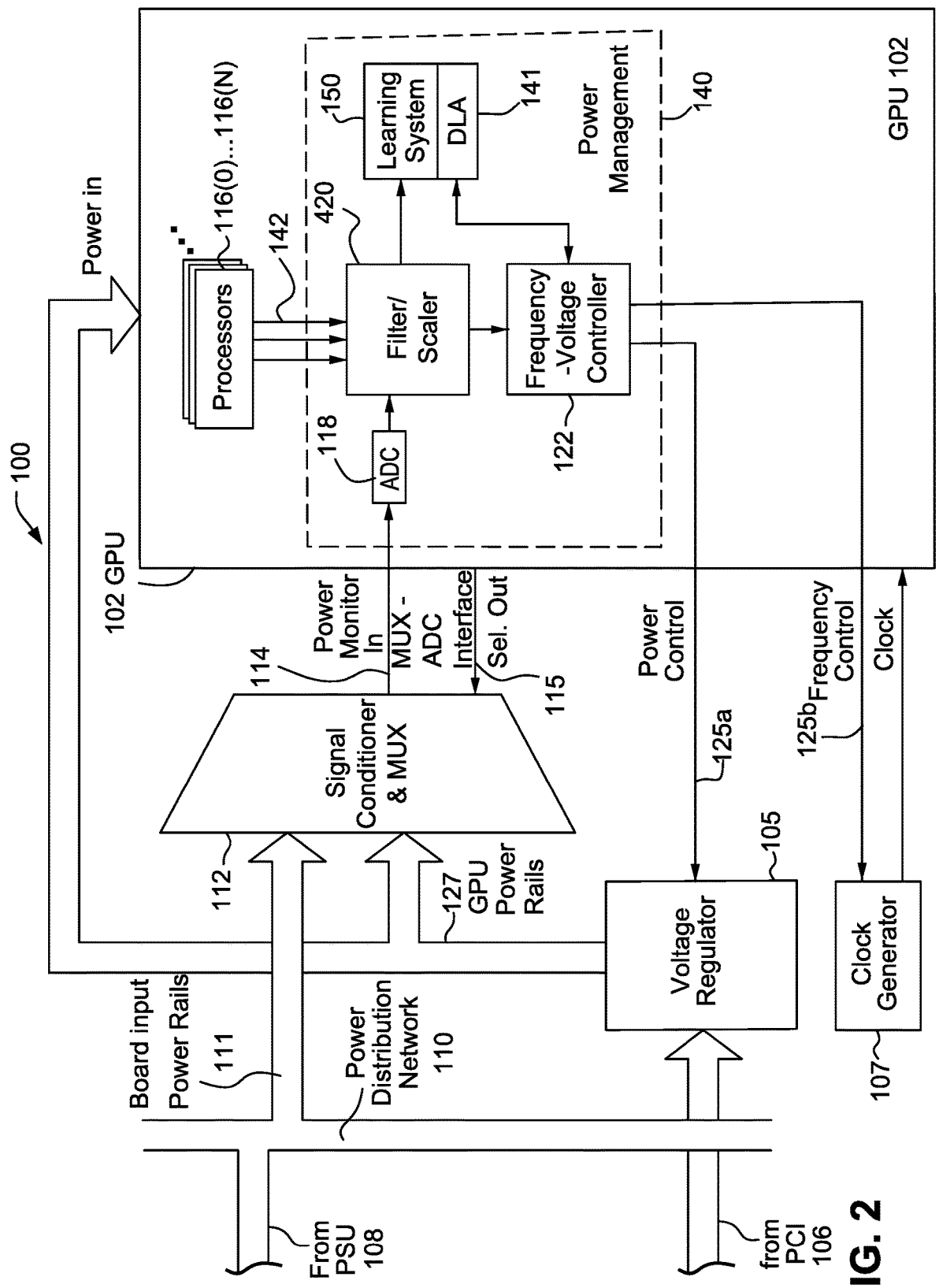

FIGS. 1 and 2 schematically illustrate an example system 100 including proactive predictive e.g., machine learning based power management control according to certain example embodiments.

System 100 may comprise one or more GPUs 102(0), . . . 102(N) communicating with one another via one or more PCI or other digital communication bus complex. GPUs 102 may be connected to associated memory(ies) 104(0), 104(N). In some embodiments, system 100 may include one or more CPUs (not shown) or other control processors communicating with the one or more GPUs 102 over the digital communication bus complex, and the control processors and GPUs may access their respective associated memories and/or a unified memory.

The GPUs 102 may be any type of GPUs such as for example an architecture with a large number of parallel processors 116. For example, each GPU 102 may include a processing complex of a large number of streaming multi-processors (SMs) 116(0), . . . 116(M) configured for highly parallel operation.

FIG. 1 illustrates the system 100 showing GPU 102 being supplied power by a power distribution network 110. A power management unit ("PMU" or "power management") 140 monitors operating voltage and/or current of the power supplied to the GPU by the power distribution network 110 and/or operating frequency of the GPU 102. The power management unit 140 also receives signals 142 from one or more parallel processors 116 indicating power that will be needed to perform instructions that have not yet been executed. For example, the processors 116 in conjunction with power management 140 may determine through instruction lookahead pre-decode what power will be needed by the processors to perform pending or future instructions before the instruction are dispatched (e.g., by a scheduler or similar structure) for execution by the processors. Based on the current operating voltage and/or frequency of the GPU 102 and the signals from the processors 116, the power management unit 140 predicts or estimates the amount of power the processors will need in the near future, and controls the voltage supplied to the GPU and/or operating frequency of the GPU clock signal so that appropriate power levels are supplied to the GPU 102 by (at) the time the instructions are executed by the processors 116.

As an example, when a math dominant workload, which consumes high energy in a clock cycle, is about to be scheduled for execution by the processors 116, the power management 140 will receive signaling from the processors 116 indicating they are about to execute math dominant workload. In response, the power management 140 predicts that the processors 116 will need higher power a few clock cycles in the future, i.e., a few cycles later than the cycles currently being executed by the processors. Based on predicted power and the power currently being drawn by the GPU 102, power management 140 may change the operating frequency and/or the voltage provided to the GPU 102 so the GPU is operating at an optimum power (not too high and not too low) to execute the instructions rapidly and efficiently. When a memory dominant workload, which consumes lower energy in a clock cycle, is about to be scheduled for execution by the processors 116, the power management 140 will receive signals indicating that instructions needing a lower power will be executed a few clock cycles later. Based on the predicted power and the current power drawn by the GPU 102, the power management 140 may reduce the operating frequency and/or voltage provided to the GPU 102 so the GPU can still efficiently execute the memory dominant workload without using more power than necessary.

In some exemplary embodiments, when instruction pre-decode alerts power management 140 that many high power instructions such as tensor or other intensive compute instructions are about to be executed by a number of different processors 116 and power management 140 predicts that such execution will likely cause an unacceptably high peak power consumption e.g., due to overshoot, power management may reduce the clock frequency, the power supply voltage, or both the voltage and the frequency in order to limit the power in anticipation of the high-power event. Limiting power by reducing the frequency and/or voltage in anticipation of the high-power event may avoid overcurrent situations, which can result in circuit damage, power supply fluctuations or excess heating.

As shown in FIG. 1, the power management 140 monitors a signal 114 of current and/or voltage sample information received from a signal conditioner and multiplexer (MUX) 112, which samples one or more power rails of the power distribution network 110. The signal 114 indicates the current power provided to the GPU 102. In some embodiments, the GPU 102 may, via a signal 115, select particular power rails to monitor. The power management 140 also receives signals 142 from one or more parallel processors 116. The GPU 102 controls the power it receives by controlling the power distribution network 110 via a signal 125 based on a difference between the current power represented by signal 115 and the predictive power determined based on signals 142.

As will be discussed in more detail below, the power management 140 may include a self-learning and self-adjusting of parameters used to predict and set the settings for the operating voltage and/or frequency. In some embodiments, the self-learning may be performed in part by a warp of one the parallel processors 116 using one or more deep neural networks that are accelerated by a hardware-based deep learning accelerator (DLA) 141 included as part of GPU 102.

In some embodiments, the power management 140 may be disposed on the same substrate or die as the parallel processors 116. In some embodiments, one or more components of the power management 140 may be provided on a substrate or die that is different from the substrate or die on which the parallel processors 116 are disposed.

According to example embodiments, system 100 may be a board comprising one or more GPUs, one or more control processors such as CPUs, and associated memory and/or memory management circuitry. In some example embodiments, GPU 102 may be a system-on-a-chip (SoC) including a GPU. In yet other embodiments, system 100 may, instead of GPU 102, include an integrated circuit with another type of processor, the frequency voltage control system, and an ADC on the same or different substrate. Embodiments of this application are not limited to supplying power to the GPU and monitoring the power used by the GPU in the manner illustrated. Other embodiments known to a person of ordinary skill in the art may be used to supply power to the GPU and/or monitor power used by the GPU.

More Detailed Schematic Block Diagram

FIG. 2 illustrates system 100 in more detail, showing the power distribution network 110 and example components of the power management 140 provided on the GPU 102. The GPU 102 includes a machine learning based system (e.g., including one or more neural networks) 150 configured to monitor the power being used by the GPU, predict power that will be needed by the GPU 102 when it executes certain soon-to-be-executed instructions, and control the voltage and/or frequency power settings of a power control system 122.

As discussed above, the power consumed by the GPU 102 can vary based on processing workloads (to be) dispatched for processing by the processors 116. For example, when all (or most) of a GPU 102's large number of parallel processors 116 (e.g., SMs) are busy processing a stream of compute instructions at high supply voltages and clock rates, the GPU 102 may draw a high amount of current from the board and/or through the voltage regulator 105. In contrast, when processing a stream of memory-dominated instructions, GPU 102 may draw substantially lower amounts of power when operating at the same clock rates because, for example, many of its parallel processors 116 may idle much of the time due to the latencies of memory access. Like food servers at a football stadium concession stand waiting for the half-time rush, the processors 116 may not have much to do other than wait while the GPU 102 accesses memory 170. In the example embodiments, the memory-dominated instructions can be processed at lower power supply voltages and clock speeds, thereby reducing power consumption and heat generation. On the other hand, when the GPU 102 is commanded (e.g., by a CPU, not shown) to perform complex computations on the data retrieved from memory, the GPU's streaming multiprocessors 116 (like the football stadium hot dog stand workers when half time begins and hungry fans have only a few minutes before the start of the second half to get a hot dog or pretzel and return to their seats) are working as fast as they can to perform their tasks.

In the disclosed embodiments, the GPU 102 includes a dynamic voltage/frequency scaling (DVFS), to scale voltage supplied to the GPU and/or frequency of the GPU's internal core clocks based the current power drawn by the GPU 102 and predicted power determined based on instructions to be executed in the near future by the parallel processors 116. By rough analogy, example embodiments keep an eye on the football field and the crowd and try to predict when the halftime rush will begin, how long the concession stand lines will be and what the customers are likely to order when they reach the head of the line. This prediction enables the concession stand workers to prepare a sufficient number of hot dogs and pretzels just in time without preparing too many.

Power Supply

In more detail, FIG. 2 shows one or more power supply units (PSUs) 108 supplying power to various parts of system 100 directly and also via power rails or connections provided by PCI bus 106. For example, GPU(s) 102 may be powered primarily or exclusively by power a voltage regulator 105 obtains from PSU 108 directly and/or via the PCI bus 106 power rail. Voltage regulator 105 steps the power supply voltage down from PCI bus 106 and/or PSU 108 levels to (programmable) voltage level(s) needed to operate GPUs 102 and supplies the stepped-down voltage(s) to the GPUs 102 via GPU power rails 127. In some embodiments, PSU 108 may alternatively or in addition supply power directly to GPUs 102 via power rails 111.

In some embodiments, the voltage regulator (VR) 105 performs direct current to direct current conversion from a high voltage to a lower voltage. This conversion is used in some example embodiments because processing chips such as the GPU 102 are designed to operate at lower voltages (e.g., 1 VDC-2 VDC) than standard 12 VDC or 5 VDC power supply voltages, which are typical for the PCI or PCIe bus 106 and/or power supply unit 108 which distribute power on the board power distribution network. The voltage regulator 105 is designed also to regulate the DC output voltage it supplies to the GPU. The output 127 of the voltage regulator supplies current to the GPU power rails 127 for distribution to the various parts of the GPU 102 and its associated supporting components and circuitry.

As described above, a plurality of input power rails supply 127 power to the GPU 102. Thus, although not specifically illustrated, voltage regulator 105 may include a separate instance for each rail. That is, in some embodiments voltage regulator 105 may include multiple voltage regulators, each of which may be separately and/or independently controlled to set a respective reference voltage etc., for a respective one of the plurality of power rails to the GPU 102.

Power Monitor

The GPU 102 may include an analog-to-digital converter (ADC) 118 that it uses to monitor (e.g., digitally sample) a "power monitor in" analog signal 114. The analog signal 114 may for example represent current and/or voltage levels provided on board input power rails 111 and GPU power rails 127.

GPU 102 uses an interface 115 to control an analog multiplexer (MUX) 112 to select a particular one of the plural power rails to be sampled for a particular time-division-multiplexed (TDM) time slot. Thus, in some example embodiments, GPU 102 can control MUX 112 to select a "round robin" sequence of different analog signal levels, allowing the GPU to periodically monitor various power supply signal levels including power levels currently being supplied to the GPU 102 itself. In other embodiments, the GPU 102 controls MUX 112 to select inputs to monitor on an as-needed basis.

Signal conditioning and MUX circuitry 112 thus selects between the plurality of input power rails 127 supplying the GPU 102, and multiplexes the selected rail to the ADC 118 over the MUX-ADC interface 114, with the selection of which signal to supply to the GPU at a particular time being made by the GPU itself in example non-limiting embodiments. Circuitry 112 may also perform signal conditioning on the signal supplied to the GPU. For example, circuitry 112 may employ voltage dividers or other circuits to scale voltage levels and/or convert current levels to voltage levels representative of the current levels. The "power monitor in" signal 114 may thus in some embodiments comprise (1) an analog voltage the level of which represents or indicates the amount of current the GPU 102 is drawing; and (2) in response to a different selection by the MUX 114, an analog voltage (which may be scaled down) representing the voltage level being supplied to the GPU. From these two values, the GPU 102 can determine the amount of power (in watts) that it is currently consuming.

The external signal conditioning and MUX circuitry 112, by way of multiplexing between the plurality of input power rails 127, enables monitoring multiple input levels using a single "power monitor in" analog input to GPU 102 and ADC 118, and thus reduces the I/O pin count of the GPU 102. The MUX-ADC interface 114 may be highly sensitive to the particulars of MUX 112 and ADC 118. The interface 114 is configured with the MUX and ADC matching each other with respect to impedance, signal range, etc. Other arrangements however are possible. For example, GPU 102 could be provided with multiple ADCs 118 to enable it to process multiple power monitoring inputs simultaneously.

In one example embodiment, the analog-to-digital converter (ADC) 118 may be configured to monitor the power supply voltage and current levels that are currently being provided to the GPU 102. As shown in FIG. 2, in one embodiment, the off-chip analog multiplexer (MUX) 112 receives as inputs, levels of power supply voltages and currents used to supply power to GPU 102. Signal conditioning such as voltage divider/scaler circuits and the like in MUX 112 provide signals that are representative of voltage levels and current levels that PSU 108 is supplying either directly or via voltage regulator 105. GPU 102 controls MUX 112 via signal 115 to select particular level signals to supply to a "monitor in" input of the GPU. U.S. patent application Ser. No. 16/046,916 (filed on Jul. 31, 2018 and entitled "Voltage/Frequency Scaling for Overcurrent Protection with On-Chip ADC") discloses additional details for using an on-chip ADC to monitor GPU power and control power supplied to the GPU.

In another embodiment, the ADC 118 may monitor "Power in" provided by the voltage regulator 105 to determine the current power used by the GPU 102.

Processor Pre-Decode and Aggregation

The processors 116 are configured to generate signals indicating, based on instruction type, a level of power that will be needed by soon-to-be-executed instructions. Processors 116 generate such signals for soon-to-be-executed instructions prior to their execution of those instructions. Each of the processors 116 may (e.g., partially) decode (for example, the op code of) a respective pending instruction for a given cycle to determine whether that instruction is a low power instruction or a high power instruction. In one embodiment, each processor 116 may generate a binary signal or flag to indicate whether a high or low level of power will be used by the respective processor (e.g., setting a flag when a processor unit will be executing instructions needing high level of power). In other embodiments, the signal indicating prospective or future power use during a given cycle may be represented by a range (e.g., value between 0 and n, where n is an integer). The processors 116 may continuously parse instructions received for near future execution and provide power estimates for executing pending instructions a few cycles before they are executed.

In one example embodiment, a filter/scaler 420 receives an aggregate of the power estimate signals from plural processors 116, filters the aggregate to remove certain types of noise, and scales the result. The filter/scaler 420 combines or compares the scaled result to the power level currently being used by the GPU as sensed/detected by the ADC 118. The result of the combination or comparison forms an error or delta signal that is used to change the control signals that control the frequency-voltage controller 122.

The power management 140 thus receives signals indicating the current power used by the GPU 102 from the ADC 118 and signals indicating estimated future power needs from the processor 116, and determines whether to change the operating voltage and/or frequency. More specifically, the power management 140 may include circuitry such as the filter/scaler 420 to accumulate the signals from the processors 116, estimate a power requirement for the GPU 102 at a given future cycle, determine an error between the estimated power for the GPU 102 and the current power used by the GPU 102, and output control signals to change the operating frequency and/or voltage in time to meet the changed power requirement. The power management 140 may maintain the current settings if the error is for example below a certain threshold indicating the power requirement is not changing much.

Frequency and/or Voltage Controller and Learning System

As will be discussed in more detail below, the frequency/voltage control system 122 may include a Proportional-Integral-Derivative (PID) controller configured to receive signal indicative of the error and output signals for moving the frequency and/or voltage up or down to reduce the error to zero. A learning system 150, which may be implemented in software and/or hardware, may be configured to monitor operation of the frequency/voltage control system 122 and update parameters (e.g., constants or coefficients employed by the PID controller) used to determine the output signals to improve performance of the frequency/voltage control system 122.

For example, the learning system 150 may modify the control parameters of the frequency/voltage control system 122 so that the error is reduced faster and/or reduce overshoots when moving the frequency and/or voltage. The learning system 150 may receive the error, the current power used by the GPU 102 and/or predicted power from the processors 116 and run a self-tuning learning algorithm that modifies the parameters used by the frequency/voltage control system 122. The learning system 150 may monitor operation of the frequency/voltage control system 122 over a predetermined number of cycles and periodically update parameters employed by the frequency-voltage controller 122.

The learning system 150 may operate on a different (e.g., slower) time scale as compared to the frequency-voltage controller 122, and in some instances may comprise software that runs on one or more of the processors 116 as accelerated by a deep learning accelerator 141. In such embodiments, the learning system 150 is used in part to predict the power a processor 116 will need to execute the learning system itself.

The output control signals of the frequency/voltage control system 122 may control at least one voltage regulator 105 (e.g., via GPIO pins on the GPU) which receives power from PCI or like bus 106 and/or power supply unit (PSU) 108 and supplies power to the GPU 102 over power rails 127. The signal conditioner and multiplexer 112 receives GPU power rails 127 and also board input power rails 111. The output control signals of the frequency/voltage control system 122 may also generate internal or external control signals that control the clock rate(s) of clocking signals a clock generator 107 generates to synchronously trigger ("clock") various GPU circuitry.

As an example, if the activity levels in the processors 116 are low, the frequency/voltage control system 122 may operate to reduce one or more supply voltages in order to reduce the amount of power supplied to the GPU. If the activity levels are high, the frequency/voltage control system 122 may increase one or more supply voltages in order to supply more power to the GPU to meet the demands of its increased processing workload.

Managing Power

Figure 3:
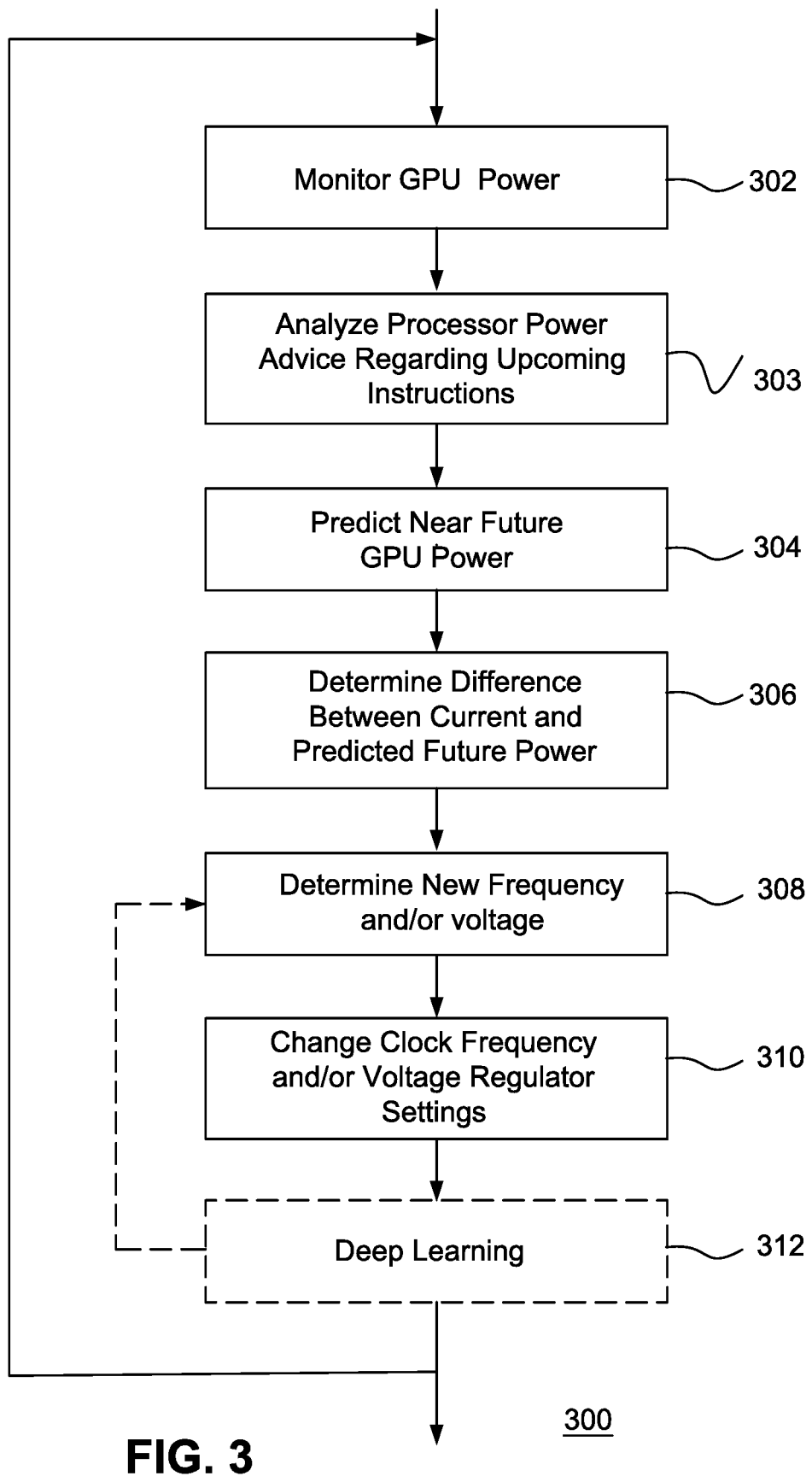
FIG. 3 illustrates a flowchart of a power control technique using current and predictive GPU power according to certain example embodiments.

FIG. 3 is a flowchart of an example power control technique using current and predictive GPU power according to certain example embodiments. In some example embodiments, process 300 (i.e., operations 302-312) is performed in hardware circuitry components on GPU 102. In some other example embodiments, in addition to operations performed on hardware of GPU 102, process 300 may include operations performed by other hardware components external to the GPU 102. In yet other example embodiments, process 300 may include, in addition to operations performed by hardware, operations performed in software that runs on GPU 102 and/or other parts of the system 100. In general however, to provide adequate speed performance, the operations shown in FIG. 3 are performed in hardware with the exception of deep learning 312, which may be performed in software with hardware acceleration.

Process 300 may be continuously or continually active during operation of a computer system in which a system, such as system 100, and/or a GPU, such as GPU 102, is being used.

Operation 302 monitors the current power used by the GPU. In embodiments, the monitoring of the input power utilizes an ADC 118 sampling the power supplied to the GPU 102. The monitoring may include the ADC 118 sampling input current and/or voltage to the voltage regulator and converting the sampling results to a digital output of any desired resolution.

At operation 304, each of the parallel processors 116 may process received instructions to provide predictive power signals 142 for pending (soon-to-be-executed) instructions. The pending instructions from the various parallel processors 116 may be aggregated and used to predict GPU power for an upcoming processing cycle during which the pending instructions will be executed (see block 304).

At operation 306, the difference (error) between the predicted GPU power and the current power is determined. Before determining the error, the predicted power may be scaled so that it is in the same scale as the determined current power.

At operation 308, the GPU 102 determines frequency and/or voltage settings to reduce the error. The determination may include using an adaptive proportional-integral-derivative (three term) controller ("PID controller") 440 (see below) to determine the settings.

At operation 310, based upon the determination made in operation 308, the GPU 102 may change (i.e., program a new) clock frequency and/or a power voltage in order to increase or decrease the power drawn by the GPU. For example, if the GPU 102 determines that a clock frequency adjustment alone can effect the required change in power, then it can adjust the frequency (or rate) for one or more clocks. A voltage may be adjusted by offsetting the voltage sent to voltage regulator to bring the current power either back under limit, or to be increased.

In some embodiments, operation 306 parameters performed using an adaptive PID controller (which may be implemented in hardware as well known to those skilled in the art) are updated based on a machine learning approach (block 312). Because the workloads in the parallel processors 116 can be diverse and vary at short time scales, a reinforced learning approach using an Actor-Critic learning may be used to update the PID parameters at a different time scale than the FIG. 3 process. For example, the FIG. 3 process of block 302-310 may be quickly performed between individual processing cycles of processors 116 based on hardware-maintained voltage and/or frequency parameters, whereas the deep learning block 312 can be performed over a number of such individual processing cycles and produce outputs that are used to more occasionally update the hardware-maintained voltage and/or frequency parameters.

In this manner, process 300 may proactively control power input to the GPU 102 in accordance with the workloads in the parallel processors to optimize processing performance and power consumption. Learning 312 is added to provide a second level of dynamic control to update the parameters used to determine power related setting for the GPU 102.

Reinforced Machine Learning

Figure 4:
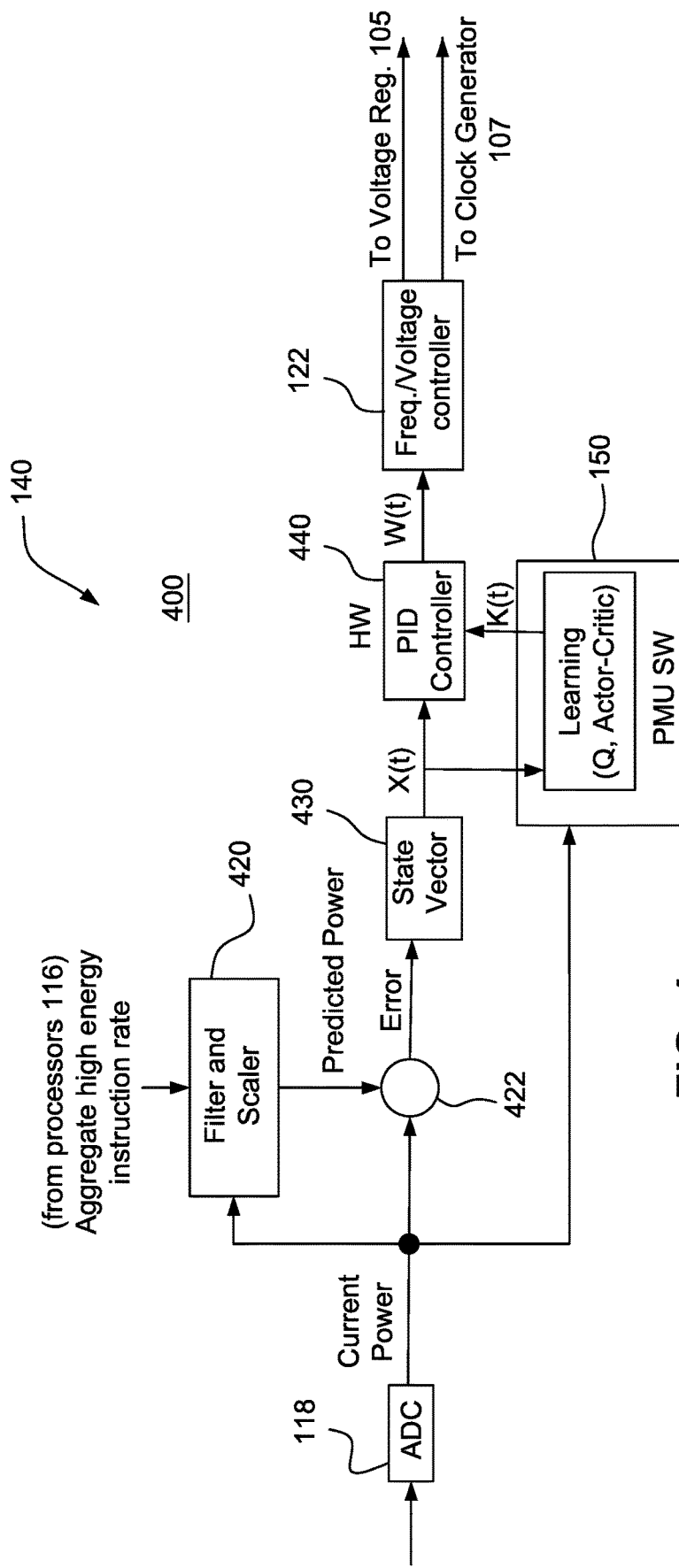
FIGS. 4 & 5 schematically illustrate a circuit implementing a proactive power management technique with a learning mechanism according to certain example embodiments.
Figure 5:
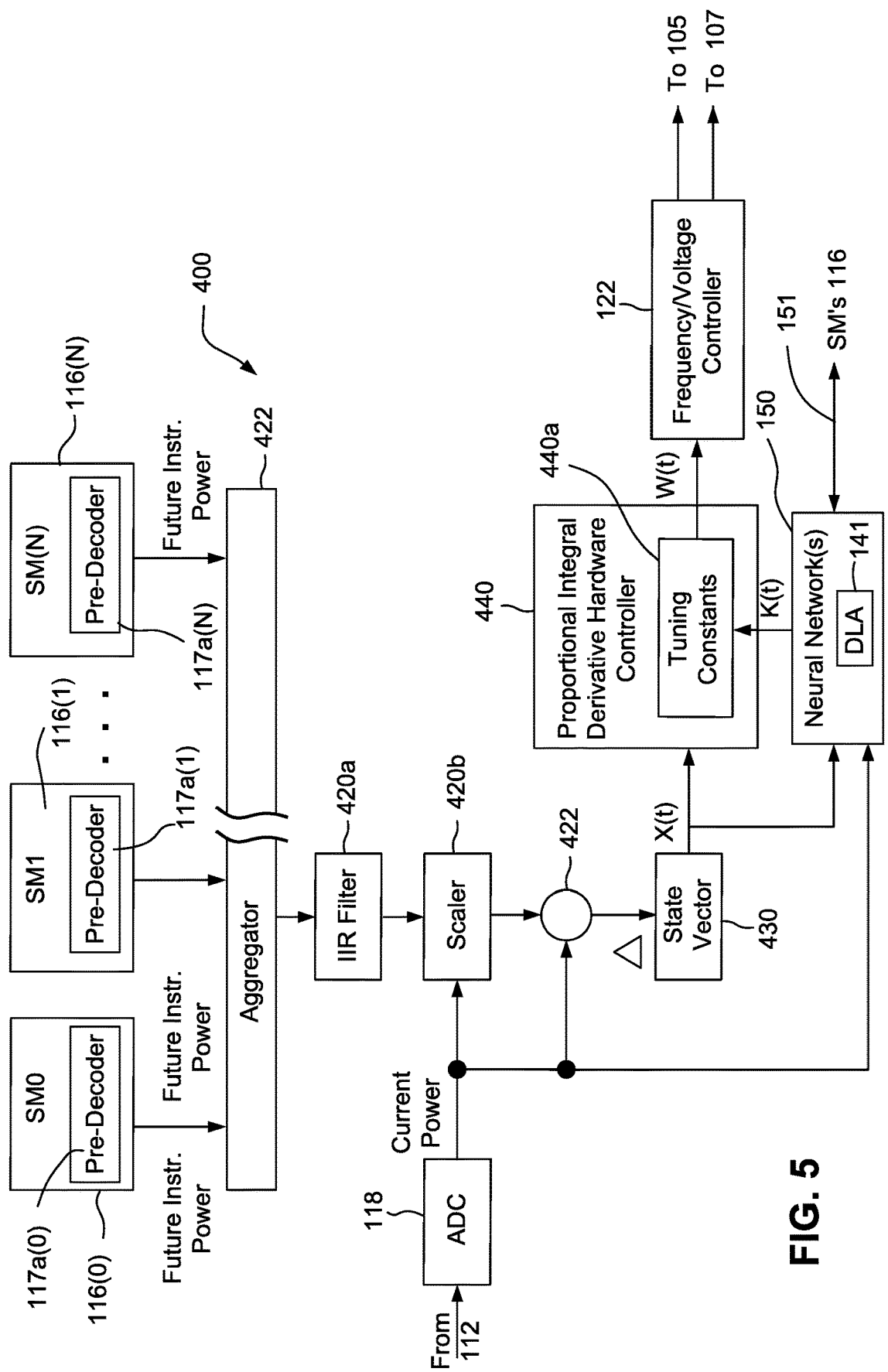

FIGS. 4 and 5 schematically illustrate a circuit 400 implementing a proactive power management technique with a learning mechanism 150, according to certain example embodiments. The circuit 400 includes ADC 118, filtering and scaler circuits 420, a comparator or summer 422, a state vector register 430, a PID controller 440, a frequency/voltage controller 450, and a learning system 460.

The circuit 400 may be fabricated on the same substrate that includes the processing system (e.g., GPU 102). Including circuit 400 on the substrate of GPU 102 provides for direct, rapid feedback and responsivity. In contrast to reactive systems that respond to changes in current power measurements, systems of example embodiments allow for adjustments to be made proactively by the processing system because the power control system can predict a slowdown or increase in processing between the time instructions are presented for execution and the time they are actually executed.

The ADC 118 may be configured to monitor the power supply voltage and current levels used by a processing system (e.g., a GPU 102) including a plurality of processors 116 (e.g., programmable streaming multiprocessors). The ADC 118 is configured to receive input signals representing voltages and/or currents being supplied to the processing system and to generate a digital output signal representing the current power used by the processing system.

The filter and scaler circuits 420 may receive prediction signals from each of the processors 116 indicating how much power instructions to be executed in the near future will or are likely to require. For example, the processors 116 can report on whether pending instructions will result in high energy consumption or low energy consumption in a clock cycle. The signal from each processor 116 may be a binary high-power/low-power flag signal or it may provide a range of different values indicating, to any desired degree of resolution, how much power may be required in the near future to execute instructions that are in the instruction pipeline but have not yet been executed but soon will be (or may be, if speculative execution is permitted).

As FIG. 5 shows, the processors 116 may each include a pre-decoder 117 configured to signal the likely energy of instructions to be executed in the future. The filter circuit 420a may be configured to receive an aggregated power signal from all of the processors 116. Such aggregated signal may be produced by an aggregator 422 which in one example embodiment comprises combinatorial logic that votes on or otherwise rapidly calculates an aggregated signal for presentation to filter 420a. The signals represent how much power pending instructions, which will be executed a predetermined number of clock cycles later by the bank of processors 116, are likely to require when executed. In one example non-limiting embodiment, these signals don't predict how much power will actually be required, only that the instructions are likely to consume more or less power based on their complexity or other instruction characteristics. For example, in one example embodiment, a processor 116 parsing a memory load instruction may signal that the upcoming instruction is likely to require low(er) power. That same processor 116 parsing a compute instruction may signal that the upcoming instruction is likely to require high(er) power.

In many embodiments, the processor 116 may not itself "know" how much power it will actually consume by executing any given instruction. This is like a long distance runner who may have an approximate idea how much energy in calories she is likely to use up when running a half marathon but will generally not be able to predict energy usage down to the calorie. There are too many variables (e.g., environmental conditions such as temperature, actual speed as opposed to a planned speed, exact body mass, etc.) that all affect actual energy usage. Furthermore, the exact power requirements of any given processor 116 will depend on characteristics of that particular processor due to manufacturing and process variations that can result in minute structural differences from GPU to GPU or even from one processor to another on the same GPU. The exact power usage will in general also depend on the particular sequence of software instructions the processors 116 execute.

In the example shown, the filter and scaler circuits 420 includes one or more filters 420a (e.g., an infinite impulse response or IIR filter) to reduce the noise in the aggregated signal received from the processors 116. The impulse response of such a filter is "infinite" because there is feedback in the filter; if an impulse (a single "1" sample followed by many "0" samples) is inputted, an infinite number of non-zero values will theoretically come out. However, other implementations could use an FIR filter, a combination of an FIR filter and an IIR filter, or any other suitable filter design.

The output of filter 420a is a near future power estimate. This near future power estimate is provided to a scaler 420b that scales the output so it can be combined with the output of ADC 118 (the scaler can be controlled in part by the magnitude of the ADC output).

The circuit 400 may further include circuitry (e.g., a summing node 422) to determine a difference or error between the ADC 118's measurement of current power and the power the filter/scaler 420 estimates will be used in a predetermined number of cycles.

The state vector register 430 receives/holds the error value to provide a value X(t) that can be used by the PID controller 440 to determine frequency and/or voltage settings. In some exemplary embodiments, X(t) accounts for error values for a plurality of clock cycles (e.g., error for current cycle, one or more past cycles, and/or one or more future cycles). The output X(t) of the state vector circuit 430 may include multiple components. In some example embodiments, the output X(t) may provide the error as a function (e.g., a multiplier function, scaling function, or unity function). In some embodiments, the state vector circuit 430 may take an error that is provided in continuous form and provide a discrete value for the PID controller 440. In one example embodiment, the output X(t) of the state vector circuit 430 may be represented by e(t), Δe(t), Δ2e(t) .... The whole vector X(t) may be provided to the learning system 460, and a subset of the state vector such as component e(t) may be provided to the PID controller 440.

The PID controller 440 receives a representation of the error between the current power and the predicted power and calculates an output W(t) depending on specific parameters stored by the PID controller 440 in a "tuning constants" register 440a. As is well known, PID controller 440 combines proportional control with additional integral and derivative adjustments which help the controller automatically compensate for changes in the system. As is well known, the PID controller 440 forces feedback to match a setpoint. Proportional tuning involves correcting a target proportional to the difference; it approaches but never reaches zero error. Integral tuning cumulates the error result from the "P" action to increase the correction factor. Since this sometimes results in an overshoot, derivative tuning is used to minimize this overshoot by slowing the correction factor applied as the target is approached. In the example embodiment, the P-I-D stages of PID controller 440 are parameterized with gain values or tuning constants for the proportional, integral and derivative terms. These parameters are stored in read/write registers 440a in the example embodiment, and can be dynamically changed by learning system 150 as described below.

The PID controller 440 output W(t) specifies changes to the operating voltage and/or frequency so the error between current power and predicted power is reduced. The output of PID controller 440 will stop adjusting the frequency and voltage when the error goes to zero. The PID controller 440 output W(t) can select between (a) a frequency only adjustment, (b) a voltage only adjustment, and (c) a voltage and frequency change, based on the timescale at which power should be managed.

The output W(t) of the PID controller 440 is provided to the frequency/voltage controller 122 for adjusting the operating frequency and/or voltage of the processing system (e.g., GPU 102). Operations of the frequency/voltage controller 450 may be performed in hardware and/or software.

Based on the output W(t), the frequency/voltage controller 122 adjusts operating frequency and/or voltage in order to allow for an increase or decrease in the power drawn by the GPU 102. For example, if it is determined that a frequency adjustment alone can affect the required change in power to reduce the error, then the frequency/voltage controller 450 may trigger a frequency change to adjust the frequency (or rate) for one or more clocks 127. The PID controller 440 may determine whether to change only the operating frequency or only the voltage or both the voltage and the frequency. In some embodiments, the degree of the error may determine what operating settings should be changed. For example, if the error is above a predetermined threshold, the PID controller 440 may call for changes in the operating voltage. The operating voltage and frequency may be changed to limit the peak power in anticipation of a high-power event, thereby improving the system level operation and reliability when operating under the max efficiency.

In some embodiments, the frequency/voltage controller 122 may adjust the voltage by offsetting the setting voltage sent to voltage regulator to bring the current power either back under limit, or to be increased.

As mentioned above, the PID controller 440 allows for fixed or self tuned parameters for the controller. Because the workloads can be diverse and vary at short time scales, reinforced learning, using for example Actor-Critic or Q Learning 150, may be used to update the PID controller 440 parameters stored in register 440a. The learning system 150 may also take care of variability of the processing systems (e.g., silicon variability) that would otherwise not be accounted for by preset PID controller 440 parameters, and prevent the PID controller 440 from overcompensating for anticipated power demands.

The learning system 150 may continuously receive the error X(t) from state vector 430, and current measured power from ADC 118. Learning system 150 may in some embodiments also receive predicted power from processors 116 and/or aggregator 422. In the example embodiment, the learning system 150 tunes the parameters 440a of the PID controller 440. The learning system 150 outputs K(t) which constitutes a PID control vector that is updated to give a dynamic characteristic based on correction efficacy.

The learning system 460 includes one or more deep neural networks that periodically update the controller parameters based on the effectiveness of the correction of the error over time. For example, if the PID 440 is initialized at time of manufacturing with tuning constants 440a that are empirically arrived at based on simulations, they will not necessarily exactly match the real hardware characteristics of any particular GPU 102. However, the learning system 150 can implement reinforcement learning to learn the actual correlation between the state vector 430 value X(t) that predicts current draw for a particular set of processor instructions, and the actual current/power draw of GPU 102 when the GPU executes those instructions. The learning system 150 can use statistical and probability analysis to determine a more optimal mapping for PID controller 440 to perform between X(t) and W(t) for a variety of different X(t)s, despite the potential complexity of the output signal W(t) and without being programmed with any preconceived model of the system or the mapping.

In example embodiments, the machine learning 150 can be accelerated by a hardware deep learning accelerator ("DLA") 141, and can perform a deep reinforced learning algorithm such as actor-critic reinforced learning or Q-learning. See e.g., Konda et al, "Actor-critic like learning algorithms for Markov decision processes", SIAM Journal on Control and Optimization, 38(1):94-123 (1999); Sutton et al., Reinforcement Learning: An Introduction (MIT Press Cambridge, Mass., 1995); and Grondman et al, "A Survey of Actor-Critic Reinforcement Learning: Standard and Natural Policy Gradients" IEEE TRANSACTIONS ON SYSTEMS, MAN AND CYBERNETICS—PART C: APPLICATIONS AND REVIEWS (2012). As summarized by Grondmon et al:

Reinforcement learning is a framework in which an agent (or controller) optimizes its behavior by interacting with its environment. After taking an action in some state, the agent receives a scalar reward from the environment, which gives the agent an indication of the quality of that action. The function that indicates the action to take in a certain state is called the policy. The main goal of the agent is to find a policy that maximizes the total accumulated reward, also called the return. By following a given policy and processing the rewards, the agent can build estimates of the return. The function representing this estimated return is known as the value function. Using this value function allows the agent to make indirect use of past experiences to decide on future actions to take in or around a certain state . . . . Actor-critic methods combine the advantages of actor-only and critic-only methods. While the parameterized actor brings the advantage of computing continuous actions without the need for optimization procedures on a value function, the critic's merit is that it supplies the actor with low-variance knowledge of the performance. More specifically, the critic's estimate of the expected return allows for the actor to update with gradients that have lower variance, speeding up the learning process. The lower variance is traded for a larger bias at the start of learning when the critic's estimates are far from accurate. Actor-critic methods usually have good convergence properties, in contrast to critic-only methods.

Deep neural networks (DNNs) such as learning system 150 developed on processors such as the processors 116 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects. Generally, reinforcement learning lies somewhere in between supervised and unsupervised learning. Whereas in supervised learning one has a target label for each training example and in unsupervised learning one has no labels at all, in reinforcement learning one has sparse and time-delayed labels— the rewards. Based only on those rewards, the agent has to learn to behave in the environment. See https://neuro.cs.ut.ee/demystifying-deep-reinforcement-learning/

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by processors 116. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the processors 116 provide a computing platform capable of delivering performance required for deep neural network-based artificial intelligence and machine learning applications such as those described above.

Figure 6:
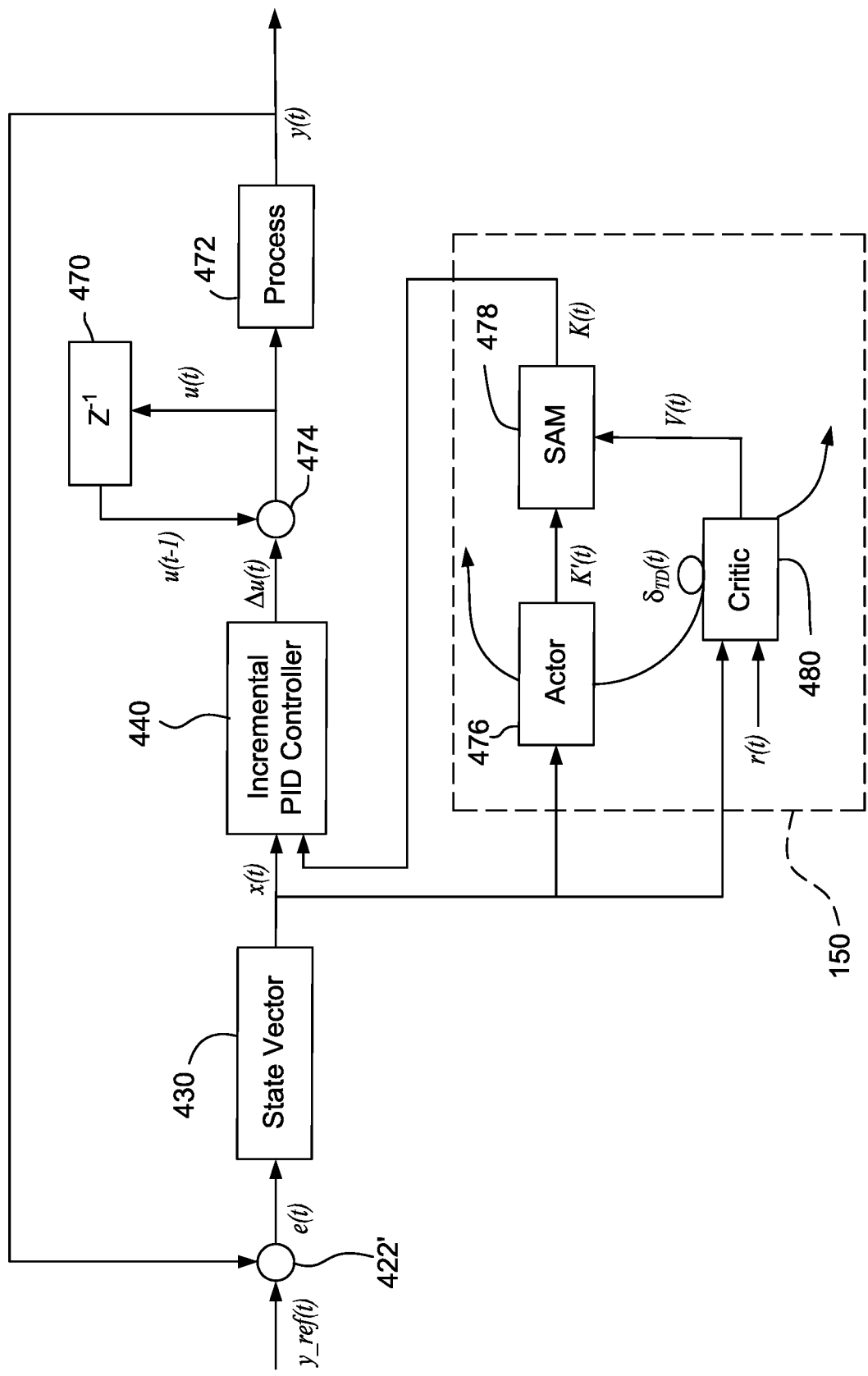
FIG. 6 is a schematic diagram of a reinforced learning proportional-integral-derivative controller.

Example Non-Limiting Reinforced Learning Proportional-Integral-Derivative Controller FIG. 6 shows an example more detailed architecture for a reinforced learning based PID controller 440. In this example implementation, input signal y_ref(t) represents the reference power we want to manage, and y(t) is an output signal representing the sum of the current sensor power+ estimated future increase in power that will be observed due to the high energy instructions. Adder 422' calculates the difference between y_ref(t) and y(t) to generate error signal e(t) for application to the state vector 430. State vector x(t) is thus a vector derived from e(t), where $$: x(t)=[x1(t),x2(t),x3(t) \ldots xn(t)]=[e(t),\text{delta}(e(t)),$$
$$\text{delta}^2(e(t)), \ldots ]: e(t)=y\_ref(t)-y(t),$$
$$\text{delta}(e(t))=e(t)-e(t-1),\text{delta}^2(e(t))=e(t)-2*e(t-1)+e(t-2), \text{ and so on.}$$

The PID controller 440 will use an element of this state vector, typically for example, e(t) will go to the block Incremental PID controller 440. The output of PID controller 440 is Δu(t) which is applied to the input of process 472 representing the frequency-voltage controller 122 and associated power adjustment mechanism. A Z−1 (memory) operator 470 provides hysteresis such that PID controller 440 output Δu(t) is used to adapt the current u(t) signal applied to control process 472. The Z−1 operator 470 stores u(t) and supplies it as u(t−1) for input to an adder 474 which adds Δu(t) to u(t−1) to produce u(t).

The learning block 150 includes an actor 476, a critic 480 and a self-adaptive module ("SAM") 478. In general, system 150 is a neural network based model that will generate the update coefficients K(t) for the PID controller 440. An input to the critic 480 is r(t), also known as a reward as an entity in reinforced learning systems. In this particular case, r(t) is a scalar value derived from e(t) and e(t−1). The objective of the learning is to attain maximum r(t).

This particular arrangement has the actor 476 supply its output K'(t) to self-adaptive module ("SAM") 478 which produces K(t) and supplies this signal as a coefficient input to PID controller 440. The coefficients form the vector of PID parameters in this example.

Meanwhile, critic 480 generates an output V(t) based on inputs x(t) and r(t), and applies output V(t) to the SAM 478, which adapts to the critic's output and transforms K'(t) to K(t).

Two Control Loop Architecture

The PID controller 440 and the learning system 150 thus provide for two control loops, the first including the PID controller 440 and the second including the learning system running on top of (and on a different time scale from) the first loop. The two control loops provide for a self-learning and self-adjusting of parameters used by the PID controller 440 to adjust the power control parameters for GPU 102 based on future power usage estimates provided by processors 116 as a result of the processors parsing their soon-to-be-executed instruction formats.

In example non-limiting embodiments, the PID controller 440 loop runs continuously and independent of the learning system 150 loop, but may be updated periodically as need is determined by the learning system loop. The learning system loop observers the operation of the PID controller 440 loop to see if there is a difference being made (e.g., reduction in error) by the currently set weighting coefficients of the PID controller 440. If there is no difference being made or the reduction in error can be improved, the learning system loop 150 may modify one or more coefficients used by the PID controller 440. The learning system 150 loop may update the PID controller coefficients during a time period when the PID controller 440 is not updating the frequency and/or voltage settings.

As mentioned above, in some exemplary embodiments, the learning system 150 may receive additional information from other components of the processing system. For example, the learning system 460 may receive information from the processors 116 about the pending instructions scheduled for execution. The learning system 460 may use this additional information to help it determine and update coefficients of the PID controller 440.

Example Non-Limiting Scaled Reinforced Learning Proportional-Integral-Derivative System In example implementations, a reinforced learning PID System can be scaled to include one or more additional PID controllers and/or one or more additional learning blocks to control the system based on separate metrics. In context of the predictive power management, the scaled reinforced learning PID System can be used to manage performance (separate metric) and power (separate metric) so that the highest potential operating point is achieved.

Figure 7:
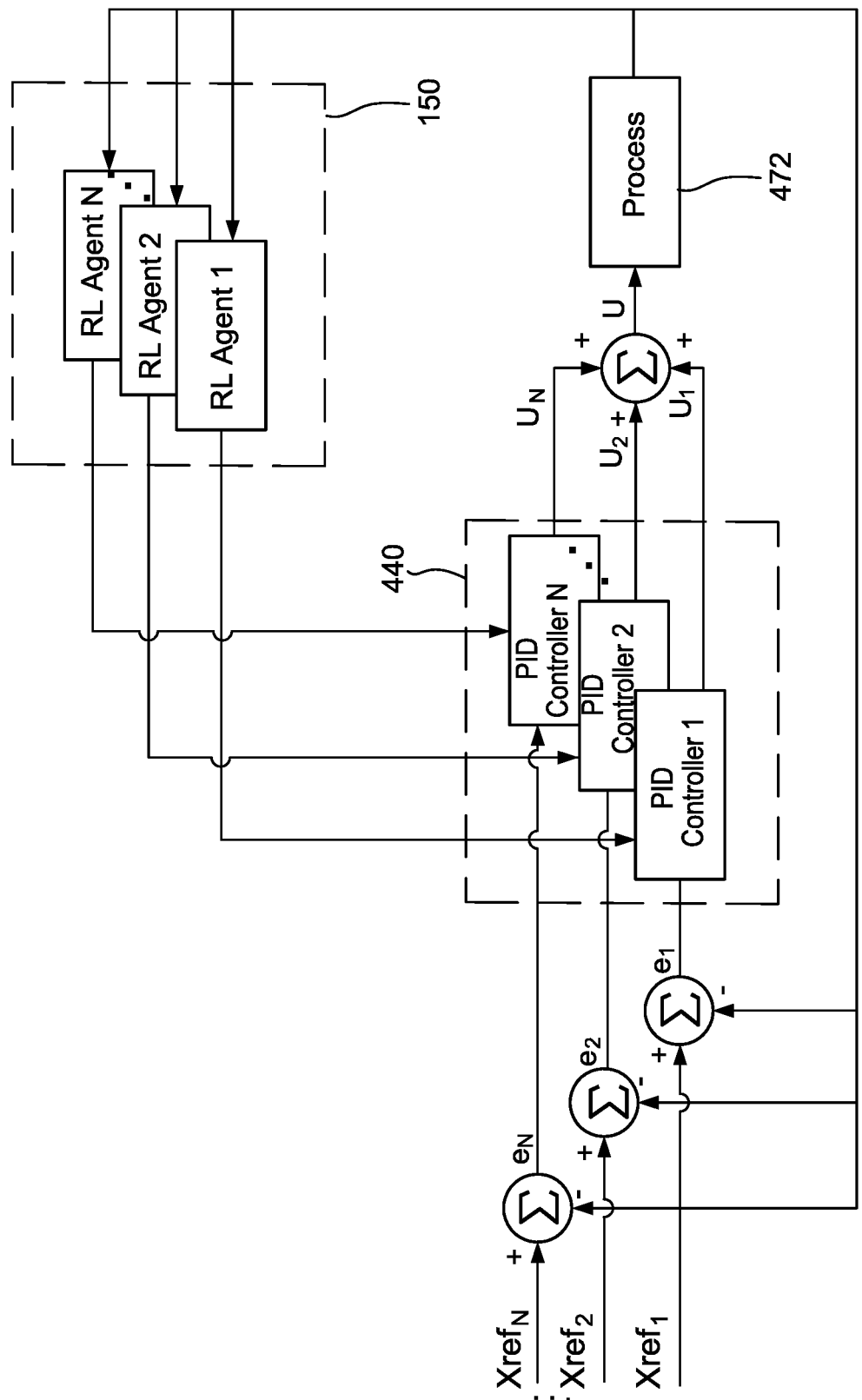
FIG. 7 is a schematic diagram of a scaled reinforced learning proportional-integral-derivative system.

FIG. 7 is a schematic diagram of a scaled reinforced learning proportional-integral-derivative system. In FIG. 7, one or more PID controllers 440 are used to control a process 472, and one or more learning systems 150 update coefficients for the one or more PID controllers 440.

As shown in FIG. 7, the process 472 may be controlled based on summed outputs of the PID controllers 440. Each PID controller may manage a separate metric setting one or more common parameters of the process 472.

In the example shown in FIG. 7, each of the PID controllers 440 is coupled to a respective learning system 150 determining the coefficients for the coupled PID controller. The learning systems 155 determine the coefficients for the PID controllers 440 based on the one or more output(s) of the process 472. In other examples, the learning systems 150 determine the coefficients based on one or more error signals input to the PID controllers 440. In some examples, a single learning system (e.g., RL Agent 1) may determine coefficients for two or more PID controllers (e.g., PID controller 1 and PID controller 2).

Figure 8:
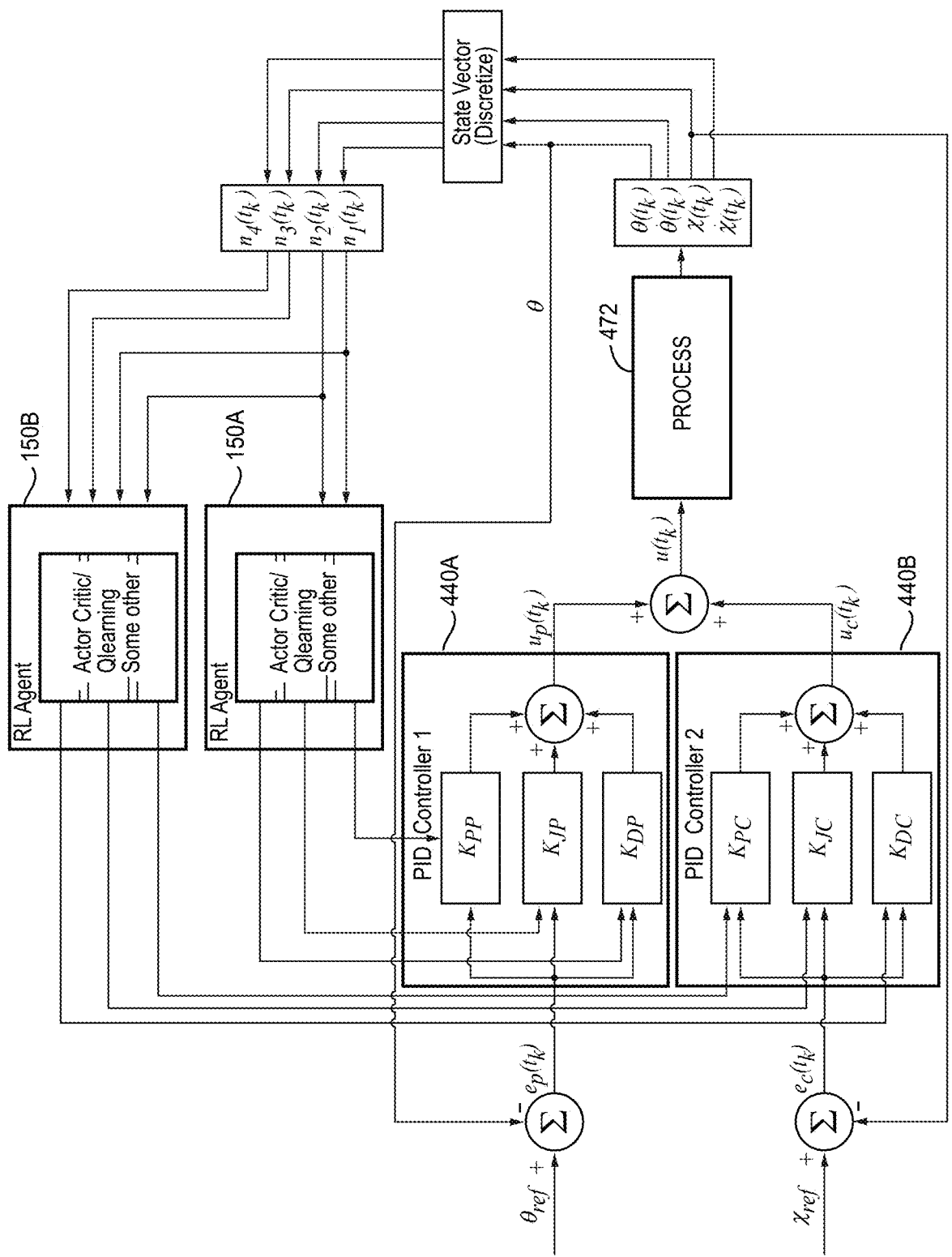
FIG. 8 is a schematic diagram of a scaled reinforced learning proportional-integral-derivative system including two PID controllers and two learning systems.

FIG. 8 shows an example architecture for a scaled reinforced learning based PID system including two PID controllers and two learning systems. In this example implementation, a first PID controller 440A and a second PID controller 440B are used to control a process 472, which may represent the frequency-voltage controller and associated power adjustment mechanism. Input signals $\theta_{ref}$ and $x_{ref}$ may represent separate metrics we want to manage, and $\theta(t_k)$ and $x(t_k)$ may represent current metric values and estimated future increase of the metric values. As an example, $x(t_k)$ may represent the sum of the current sensor power+estimated future increase in power that will be observed due to the high energy instructions, and $\theta(t_k)$ may represent the sum of the current performance+estimated future increase in performance that will be observed due to the high energy instructions. In some example implementations, the first metric may represent a voltage of the process 472 and the second metric may represent a frequency of the process 472.

The first PID controller 440A receives a first metric error signal $e_p(t_k)$ representing a difference between $\theta_{ref}$ and $\theta(t_k)$. The second PID controller 440B receives a second error signal $e_c(t_k)$ representing a difference between $x_{ref}$ and $x(t_k)$. The first PID controller 440A and the second PID controller 440B output values $u_p(t_k)$ and $u_c(t_k)$, respectively, are determined based on the received errors and the coefficients K(t) set in the controllers. As shown in FIG. 8, the output values $u_p(t_k)$ and $u_c(t_k)$ may be summed and provided to the process 472.

The output values $u_p(t_k)$ and $u_c(t_k)$ are summed when separate metrics set one or more common parameters of the process 472. As an example, if the operating clocks are set based on performance and power (since clocks can impact both), the outputs will be used to drive/set common parameters that control the process.

In other examples, the output values $u_p(t_k)$ and $u_c(t_k)$ may be provided directly to process 472 for determining how the output values $u_p(t_k)$ and $u_c(t_k)$ will drive/set parameters that control the process 472.

As shown in FIG. 8, the first PID controller 440A and the second PID controller 440B may each be coupled to a respective learning system for updating coefficients of the controllers. A first learning system 150A generates one or more update coefficients $K_{PP}$, $K_{IP}$, and/or $K_{DP}$ for the first PID controller 440A. A second learning block 150B generates one or more update coefficients $K_{PC}$, $K_{IC}$, and/or $K_{DC}$ for the second PID controller 440B. The first learning block 150A and the second leaning block 150B receive one or more components of a state vector $(n_1(t_k), n_2(t_k), n_3(t_k), n_4(t_k))$ representing the discrete values of process 472 outputs. The state vector values $n_1(t_k), n_2(t_k), n_3(t_k),$ and $n_4(t_k)$ are derived from the process 472 outputs $\theta(t_k), \dot{\theta}(t_k), x(t_k),$ and $\dot{x}(t_k)$.

In the example shown in FIG. 8, the first learning block 150A receives state vector values $n_1(t_k)$ and $n_2(t_k)$, and the second learning block 150B receives state vector values $n_1(t_k), n_2(t_k), n_3(t_k),$ and $n_4(t_k)$. While FIG. 8 shows the learning blocks receiving different set of values, the first learning block 150A and the second learning block 150B may receive the same set of values or different sets of values.

In other examples, the learning systems 150A and/or 150B may use element(s) of a state vector of the error signal $e_p(t_k)$ and/or error signal $e_c(t_k)$ to update the coefficients of the first and/or second PID controller.

Example Non-Limiting Reinforced Learning Feedback Loop Control Method

Figure 9:
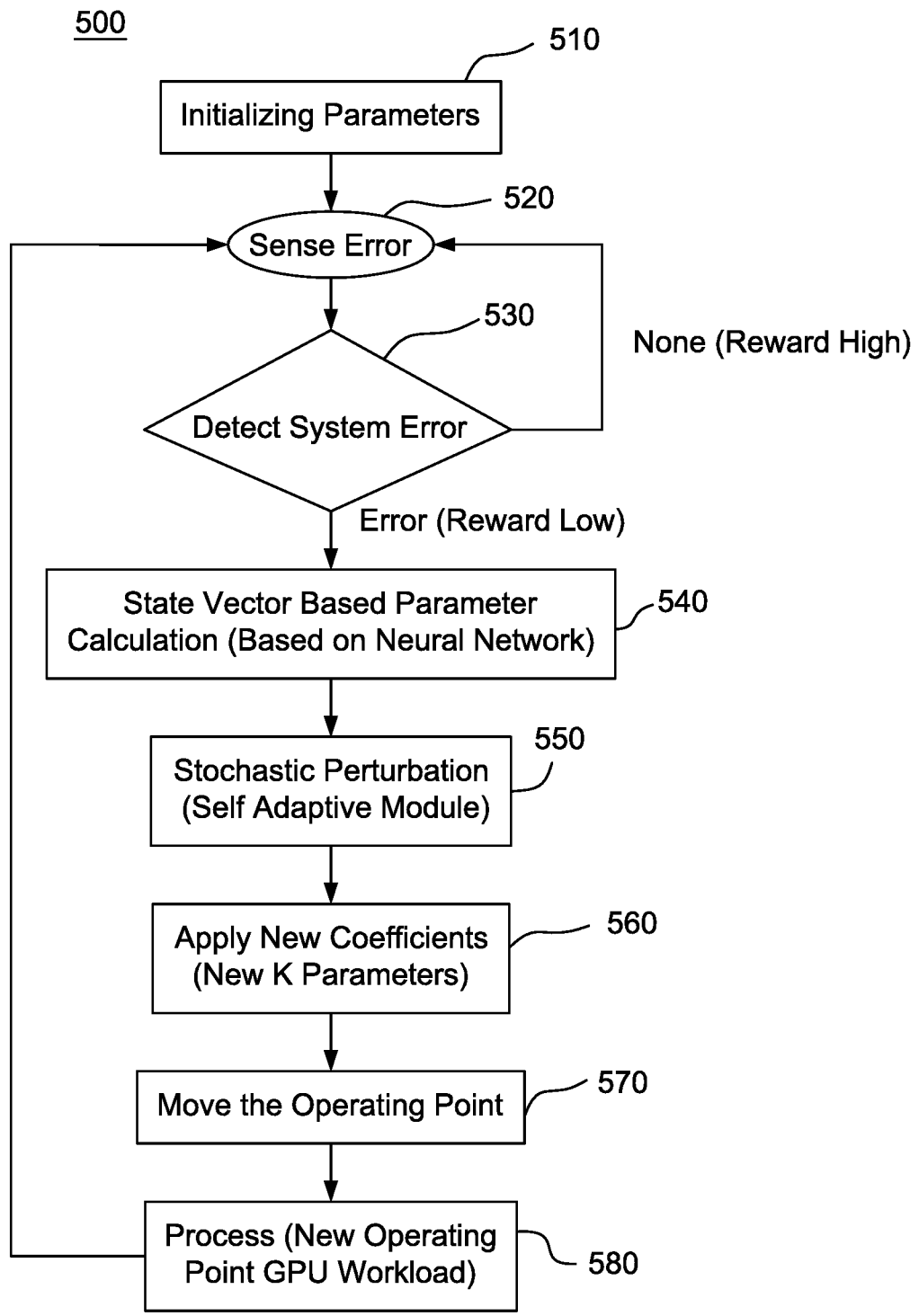
FIG. 9 illustrates a reinforced learning feedback control method according to certain example embodiments.

FIG. 9 is a flowchart of a reinforced learning feedback control method according to certain example embodiments.

For starters, operation 510 initializes one or more parameters. These parameters may for example include the parameters used by the PID controller 440 to affect the power control parameters for GPU 102.

Operation 520 senses an error e.g., by generating error signal e(t) for application to the state vector 430, such as provided by calculating the difference between y_ref(t) and y(t).

Operation 530 uses reinforced learning to detect whether the sensed error is a system error that requires correction. Reinforcement learning is able to correlate immediate actions with the delayed returns they produce. Like humans, reinforcement learning algorithms sometimes need to wait a while to see the result of their decisions. They can thus operate in a delayed return environment, where it can be difficult to understand which action leads to which outcome over many time steps. Reinforcement learning algorithms thus can be expected to perform better in ambiguous environments such as power control having unknown factors (e.g., the degree of parallelism of particular instructions/threads/warps of particular software applications or functions thereof, the number of GPU transistors that will be activated and deactivated based on such parallel operation, etc.) while choosing between an arbitrary number of possible actions. In example operation of a non-limiting embodiment, the critic neural network of a reinforced machine learning system has been trained on previous power adjustment operations in response to previous sensed errors, and has assessed an accumulated reward, i.e., a value assessment of how advantageous it is to be in particular state. If the neural network determines based on the sensed error that the assessed reward is high, the state vector is not changed and "sense error" operation 520 is repeated continually. If however the neural network detects based on the sensed error that the reward is low, additional processing to change the state vector (explained below) is invoked.

To change the state vector when the assessed reward is low, the example non-limiting embodiment performs an operation 540, i.e., a state vector based parameter calculation based on the neural network (in other embodiments, the state vector based calculation could be performed in other ways such as incrementing or decrementing by a certain amount etc.). This calculation may include for example calculating coefficients K'(t) for the PID controller 440. In one example non-limiting embodiment, the state vector based parameter calculation may be performed by the actor 476 based on the state vector x(t) derived from error signal e(t).

In one example non-limiting embodiment, operation 550 performs stochastic perturbations to transform calculated coefficients K'(t) to K(t). Transforming coefficients K'(t) to K(t) may be performed by the self-adaptive module ("SAM") 478 based on the output V(t) from the critic 480. In operation 560, the new coefficients K(t) derived by the neural network are applied to the PID controller 440.

Applying new coefficients K(t) to the PID controller 440 causes the operating point for the GPU power settings to move (block 570). This operating point movement may include adjusting the output frequency of the frequency-voltage controller 122 and/or adjusting the output voltage using the power adjustment mechanism. The result of the process performed by the frequency-voltage controller 122 and associated power adjustment mechanism sets the new frequency and/or voltage operation point of the GPU. The GPU then processes instructions using the new operating point (block 580). Meanwhile, the neural network learns from the effect of this operation and uses this additional learning on the next iteration of the FIG. 9 process.

Overcurrent Prevention

In some exemplary embodiments, the frequency/voltage controller 450 may delay, preempt or prevent the execution of the pending instructions in one or more processors (e.g., SMs). For example, the frequency/voltage controller 450 and/or the machine learning 150 may receive the output from the PID controller 440 and determine when execution of the instructions would result in frequency and/or voltage settings that exceed predetermined limits (e.g., safe limits). Based on this determination, the frequency/voltage controller 450 may issue signals to delay or stop processing the pending instructions for one or more cycle. The signals to delay or stop processing the instructions may be issued to one or more of the processors via conventional preemption mechanisms known to those skilled in the art. The frequency/voltage controller 450 may determine in how many processors 116 the processing of high energy instructions need to be delayed in order to avoid exceeding the predetermined safety limits. For example, when a determination is made that executing the pending instructions in the processors 116 will cause the power settings to exceed predetermined limits and thus potentially cause overheating, brownouts or other undesirable effects, the frequency/voltage controller 450 may transmit a delay signal to one or more processors so that all of the high-energy consumption instructions are not executed during a given clock cycle. Such load balancing can even out the high power computation over time while having minimal impact on overall speed performance.

Exemplary embodiments of this disclosure are not limited to using a PID controller and Actor-Critic or Q Learning illustrated in FIGS. 4 and 5. Other feedback controllers and learning systems may be used with the exemplary embodiments disclosed in this application. For example, a PID or other neural network controller (if fast enough) may be used to determine changes that should be applied to the operating frequency and/or voltage of the GPU based on the error between the current and predicted power.

As described above, conventional GPU's have been limited to the use of reactive mechanisms to manage power of the GPU. Such reactive mechanisms however, leave the GPU internal components vulnerable to electrical reliability issues (e.g., internal component damage and/or for the GPU to be shut down and dropped off the communication buses). Embodiments of this disclosure provide for proactive sensing of instructions to predict likely load step/release event, which allows for upcoming load step/release event to be known prior to the event actually occurrence a few clock cycles later. Predicting the load step/release event allows for the power settings of the GPU to be adjusted (e.g., by changing voltage and/or frequency) before the event happens in order to prevent peak power scenarios. Moving the voltage and/or frequency in this manner can reduce electrical reliability issues at shorter timescales than other approaches, but without compromising performance. In addition, the learning system, operating in parallel to the PID controller 440, provides for a dynamic adjustment of parameters used for determining the changes that should be made to the operating voltage and/or frequency to anticipate and prevent such undesired peak power scenarios.

GPUs including proactive power management systems according to embodiments provide increased reliability at shorter timescales than other approaches, but without compromising performance, and are accordingly usable in computing environments which require high levels of reliability. GPUs and SoCs including one or more GPUs according to embodiments can be implemented in data centers, server environments, gaming computers, laptop computers, and other computing environments. Embodiments may also be used in environment such as autonomous vehicles, robots, and the like. For example, embodiments may improve the operational reliability of autonomous vehicle applications by ensuring that the GPU does not even momentarily fall off the communication bus due to overcurrent situations. Embodiments may also improve the power consumption of autonomous (or other) vehicles by implementing a faster power management response.

Embodiments, however, are not limited to GPUs and SoC including GPUs. Other embodiments may provide on-chip ADC on CPU chips, or other types of processors.

Embodiments of the subject matter and the functional operations described herein can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory storage medium for execution by, or to control the operation of, data processing apparatus (i.e., one or more computer programs). The computer storage medium can be one or more of: a machine-readable storage device, a machine-readable storage substrate, a random or serial access memory device, and combinations thereof.

Each of the items cited above is incorporated by reference for all purposes as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A GPU comprising:
parallel processors each including an instruction decoder that decodes instructions before execution and signals anticipated power usage of instruction execution;
a power controller that adjusts power supplied to the processors at least in part in response to the signaled anticipated power usage; and
a neural network that adapts the adjustment the power controller performs,
wherein the neural network performs reinforced learning to mitigate peak power scenarios.

2. The GPU of claim 1 wherein the instruction decoder comprises an instruction lookahead pre-decoder that predecodes instructions to be executed in the future and estimates how much power will be used to execute the instructions, and the parallel processors each include an additional instruction decoder that decodes the instructions for execution.

3. The GPU of claim 1 wherein the power controller is configured to decrease power to avoid peak power overshoot.

4. The GPU of claim 1 wherein the neural network controls the parallel processors to modify their instruction execution to reduce peak power requirements.

5. A processing system comprising:
a plurality of processors; and
power management circuitry configured to:
compare power being used by the plurality of processors and predicted power that is estimated to be used by the plurality of processors in the future;
generate one or more control signals to change operating power of the plurality of processors in response to the comparison; and
perform reinforcement learning to adapt the generation of the one or more control signals.

6. The processing system of claim 5, wherein the reinforced learning uses actor critic-based machine learning or Q-learning machine learning.

7. The processing system of claim 5, wherein the power management circuitry includes a Proportional-Integral-Derivative (PID) controller configured to receive a difference result of the comparison and generate the one or more signals to change operating frequency and/or voltage of the processing system.

8. The processing system of claim 7, wherein the reinforcement learning modifies operating coefficients of the PID controller.

9. The processing system of claim 7, wherein the PID controller generates the one or more signals every clock cycle and the reinforcement learning modifies operating coefficients of the PID controller at intervals that exceed a clock cycle.

10. The processing system of claim 5, wherein:
each processor is configured to pre-decode instructions received by the respective processor and generate a signal, based on the pre-decoded instructions, estimating energy consumption level of pending instructions; and
the power management circuitry is further configured to aggregate the signals indicating energy consumption level from each processor and predict power based on the aggregated signals.

11. The processing system of claim 5, wherein the power management circuitry is configured to adjust, based on the one or more generated control signals, the operating frequency and voltage of the processing system.

12. The processing system of claim 5, wherein the power management circuitry is configured to, based on the one or more generated control signals, control one or more of the processors to delay execution of one or more pending instructions.

13. The processing system of claim 5, wherein the power management circuitry includes an analog to digital converter (ADC) configured to receive input signals representing voltages and/or currents being supplied to the processing system, and generate, based on the input signals, a digital output signal representing the power being used by the processing system.

14. The processing system of claim 5, wherein the plurality of processors and the power management circuitry are disposed on a same substrate.

15. A method for dynamically controlling voltage and frequency settings for a plurality of processors configured to receive and execute instructions, the method comprising:
measuring power currently used by the processors;
predicting power of the processors by examining instructions to be executed by the processors;
determine an error between the current power and the predicted power;
generate one or more signals to change operating frequency and/or voltage to reduce the error; and perform reinforcement learning to adapt the generating of the one or more signals.

16. The method of claim 15, wherein generating the one or more signals includes using a Proportional-Integral-Derivative (PID) controller to generate, based on the error, the one or more signals to change operating frequency and/or voltage supplied to one or more of the processors.

17. The method of claim 16, wherein the PID controller generates the one or more signals at intervals corresponding to clock cycles, and the reinforcement learning modifies coefficients of the PID controller at intervals that exceed the intervals corresponding to clock cycles.

18. The method of claim 16, wherein the reinforcement learning modifies coefficients of the PID controller.

19. The method of claim 15 further comprising:
generate a signal for each processor representing energy consumption level of pending instructions that will be executed at a clock cycle; and
determine the predicted power by aggregating the signals representing energy consumption level of pending instructions for the corresponding clock cycle.

20. A controller comprising:
a power monitor configured to monitor a voltage and/or current being supplied to a plurality of processors;
circuitry configured to receive, from the plurality of processors, signals representing estimated energy consumption for executing instructions in the future, and to predict, based on aggregation of the received signals, power that will be used by the processors in the future for executing said instructions; and
a self-learning and self-adjusting controller configured to control power supplied to the processors in response to the monitored voltage and/or current and the predicted power.

21. The controller of claim 20, wherein the self-learning and self-adjusting controller includes:
a proportional-Integral-Derivative (PID) controller configured to determine power to be supplied to the processors based on coefficients, and
at least one neural network configured to perform reinforcement machine learning to modify the coefficients.

22. The controller of claim 20, wherein the self-learning and self-adjusting controller is disposed on a same substrate as the processors.

23. The controller of claim 20 wherein the self-learning and self-adjusting controller is further configured to, based on the determined power to be supplied to the processors, send a signal to one or more of the processors to delay execution of at least one instruction.

24. The controller of claim 20, wherein the self-learning and self-adjusting controller includes:
a proportional-Integral-Derivative (PID) controller configured to determine power to be supplied to the processors based on coefficients, and
at least one neural network configured to perform Actor-Critic reinforcement machine learning to modify the coefficients based on a difference between energy supplied to the plurality of processors and the estimated energy consumption for executing instructions in the future.

25. The controller of claim 20, wherein the self-learning and self-adjusting controller includes:
a plurality of proportional-Integral-Derivative (PID) controllers, each PID controller generating control signals based on a different metric affecting the operation of the plurality of processors; and
a plurality of neural networks, each neural network configured to perform reinforced machine learning to modify coefficients of a respective PID controller,
wherein the power supplied to the processors is controlled based on a sum of the outputs of the PID controllers.

* * * * *